United States Patent
Yamauchi et al.

(10) Patent No.: US 11,742,505 B2
(45) Date of Patent: Aug. 29, 2023

(54) FUEL CELL SYSTEM

(71) Applicants: KYOCERA CORPORATION, Kyoto (JP); DAINICHI CO., LTD., Niigata (JP)

(72) Inventors: Kyosuke Yamauchi, Yokohama (JP); Mitsutaka Shimada, Kirishima (JP)

(73) Assignees: KYOCERA Corporation, Kyoto (JP); DAINICHI CO., LTD, Niigata (JP)

( * ) Notice: Subject to any disclaimer, the term of this patent is extended or adjusted under 35 U.S.C. 154(b) by 104 days.

(21) Appl. No.: 17/434,058

(22) PCT Filed: Feb. 19, 2020

(86) PCT No.: PCT/JP2020/006583
§ 371 (c)(1),
(2) Date: Aug. 26, 2021

(87) PCT Pub. No.: WO2020/175284
PCT Pub. Date: Sep. 3, 2020

(65) Prior Publication Data
US 2022/0140366 A1     May 5, 2022

(30) Foreign Application Priority Data

Feb. 28, 2019   (JP) ................. 2019-036897

(51) Int. Cl.
*H01M 8/04858*   (2016.01)
*H01M 8/0432*   (2016.01)
(Continued)

(52) U.S. Cl.
CPC ....... *H01M 8/0494* (2013.01); *H01M 8/0432* (2013.01); *H01M 8/04753* (2013.01); *H01M 8/04007* (2013.01)

(58) Field of Classification Search
CPC ............ H01M 8/0494; H01M 8/0432; H01M 8/04753; H01M 8/04007
See application file for complete search history.

(56) References Cited

U.S. PATENT DOCUMENTS

| 2012/0183876 A1 | 7/2012 | Takashi et al. | |
| 2013/0183599 A1* | 7/2013 | Otsuka | H01M 8/04052 429/408 |
| 2013/0209903 A1* | 8/2013 | Otsuka | H01M 8/04303 429/416 |

FOREIGN PATENT DOCUMENTS

| JP | 2004273162 A | | 9/2004 |
| JP | 2005268091 A | * | 9/2005 |

(Continued)

OTHER PUBLICATIONS

Machine Translation of JP-2012003884-A (Apr. 19, 2023) (Year: 2023).*

(Continued)

*Primary Examiner* — Matthew J Merkling
(74) *Attorney, Agent, or Firm* — VIERING, JENTSCHURA & PARTNER MBB

(57) ABSTRACT

A fuel cell system includes a controller that controls an amount of air flow to be supplied from an air blower included in an oxygen-containing gas supply to a cell stack to cause a power level (in amperes) of a fuel cell controllable by a power level regulator (power conditioner) and an air utilization to have an increase-control section in which the air utilization increases in accordance with an increase in the power level of the fuel cell and a decrease-control section in which the air utilization decreases in accordance with an increase in the power level. The air utilization is a ratio of an air amount used by the fuel cell for power generation to an oxygen-containing gas (air) amount supplied to the fuel cell.

4 Claims, 3 Drawing Sheets

(51) Int. Cl.
*H01M 8/04746* (2016.01)
*H01M 8/04007* (2016.01)

(56) References Cited

FOREIGN PATENT DOCUMENTS

| | | | |
|---|---|---|---|
| JP | 2006253034 A | | 9/2006 |
| JP | 2012003884 A | * | 1/2012 |
| JP | 5591249 B | | 8/2014 |

OTHER PUBLICATIONS

Machine Translation of JP-2005268091-A (Apr. 19, 2023) (Year: 2023).*

* cited by examiner

FUEL CELL SYSTEM

CROSS-REFERENCE TO RELATED APPLICATIONS

This application is a national stage entry according to 35 U.S.C. § 371 of PCT Application No. PCT/JP2020/006583 filed on Feb. 19, 2020, which claims priority to Japanese Application No. 2019-036897 filed on Feb. 28, 2019, which are entirely incorporated herein by reference.

TECHNICAL FIELD

The present disclosure relates to a fuel cell system.

BACKGROUND

A fuel cell system is described in, for example, Patent Literature 1 (Patent Literature 1: Japanese Patent No. 5591249).

SUMMARY

A fuel cell system according to one or more non-limiting aspects of the present disclosure may include a fuel cell that generates electricity using a fuel gas and an oxygen-containing gas, an oxygen-containing gas supply that supplies the oxygen-containing gas to the fuel cell, a power level regulator that regulates a power level of the fuel cell, and a controller that controls the oxygen-containing gas supply and the power level regulator.

The controller may control the oxygen-containing gas supply and the power level regulator to cause the power level of the fuel cell controllable by the power level regulator and an oxygen-containing gas utilization to have an increase-control section in which the oxygen-containing gas utilization increases in accordance with an increase in the power level of the fuel cell and a decrease-control section in which the oxygen-containing gas utilization decreases in accordance with an increase in the power level of the fuel cell. The oxygen-containing gas utilization is a ratio of an amount of the oxygen-containing gas used by the fuel cell for power generation to an amount of the oxygen-containing gas supplied to the fuel cell.

BRIEF DESCRIPTION OF DRAWINGS

The objects, features, and advantages of the present disclosure will become more apparent from the following detailed description and the drawings.

DETAILED DESCRIPTION

A fuel cell system according to one or more non-limiting embodiments of the present disclosure will now be described with reference to the drawings.

A fuel cell system with the structure that forms the basis of a fuel cell system according to one or more non-limiting embodiments of the present disclosure will be described first.

A fuel cell system including solid oxide fuel cells (SOFCs) includes a controller that controls the operations of a raw fuel supply and an oxygen-containing gas supply to supply, to each unit cell, a raw fuel (hydrogen-containing gas) and air (oxygen-containing gas) in amounts intended for power generation. Direct current (DC) resulting from power generation is converted to alternating-current (AC) power by a power level regulator that operates in cooperation with an external electrical grid. The AC power is then fed to an external load as requested from an external device (external load) that is connected to the power level regulator.

Fuel cells are also used in small-scale power generation for applications that use low power (current value), such as homes and small businesses. For fuel cell systems for home use, for example, the level of power requested by an external load varies relatively largely.

To adjust output power levels, a fuel cell system undergoes high air utilization control during a low-current operation (low-output operation) performed for a low power level requested externally (current value of an external load). In the high air utilization control, the air utilization (Ua) increases as the output power level increases.

During a high-current operation (high-output operation) performed for a high current value of an external load, the fuel cell system undergoes constant air utilization control, in which the air utilization (Ua) is maintained at a predetermined high utilization (hereafter, high Ua ratio) to maintain highly efficient power generation.

The high-current operation (high-output operation) may be referred to as an operation involving a rated level of power generation or a near rated level of power generation. The low-current operation (low-output operation) may be referred to as either a partial load operation or a load-following operation.

In response to an increase in the output power level of the fuel cell to meet the power level requested by an external load, the fuel cell system may change the air utilization (Ua) of each unit cell and may continuously undergo the above constant air utilization control, in which the air utilization is maintained at the predetermined high Ua ratio under a high external load (externally requested power level). However, this may increase the temperature of the fuel cell and lower the durability of the unit cell, thus affecting the power generation efficiency.

A fuel cell system according to one or more non-limiting embodiments will now be described.

Figure 1:
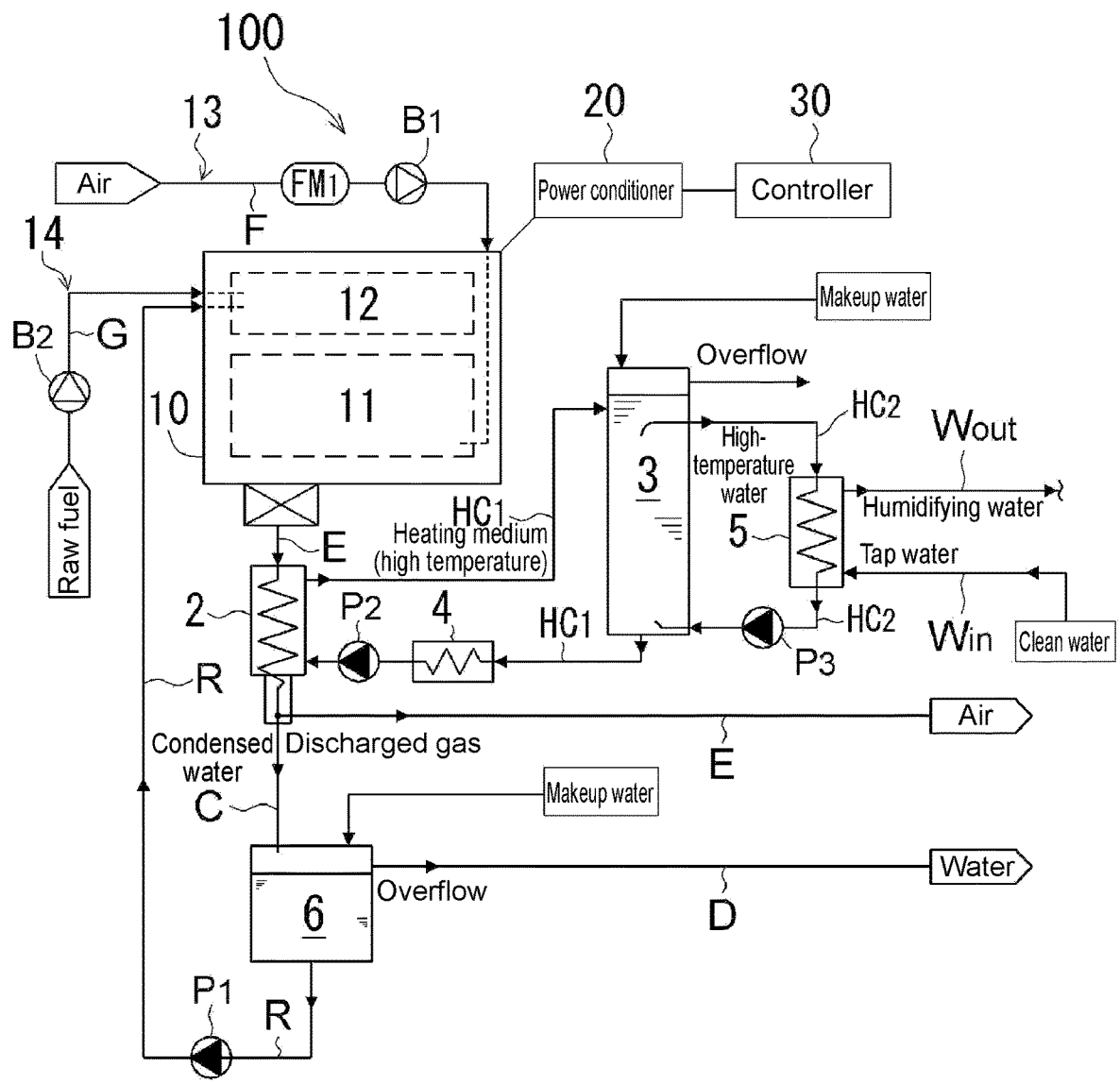
FIG. 1 is a schematic diagram of a fuel cell system according to a non-limiting embodiment of the present disclosure.

A fuel cell system 100 according to a non-limiting embodiment shown in FIG. 1 includes a fuel cell module 10 that generates electricity using a fuel gas and an oxygen-containing gas and auxiliary devices for assisting an independent power generation operation of the fuel cell. The auxiliary devices include an oxygen-containing gas supply 13 including an air blower B1 and an air channel F, a raw fuel supply 14 including a raw fuel pump B2 and a raw fuel channel G, a reformed water tank 6, and a reformed water pump P1.

The fuel cell system 100 further includes a power level regulator (power conditioner 20) as an auxiliary device that feeds power to an external unit and coordinates with the electrical grid, and a controller 30 that controls the operation of the auxiliary devices assisting the power generation operation of the fuel cell as described above in cooperation with the power conditioner 20. The power conditioner 20 includes an ammeter (in amperes) and a voltmeter (in volts).

The fuel cell system 100 according to the non-limiting embodiment further includes a waste heat recovery system (heat cycle HC1). The waste heat recovery system includes a heat exchanger 2, a heat storage tank 3 (also referred to as a hot water tank), a heat dissipater (radiator 4), and channel pipes connecting these components, and a heating medium pump P2.

The fuel cell system 100 shown in FIG. 1 further includes a second heat exchanger 5 (also referred to as a clean water heat exchanger) for heating tap water (clean water) to be supplied to an external unit, and a hot water supply system (heat cycle HC2). The hot water supply system includes a heat pump P3 and a circulation pipe for receiving and circulating a high-temperature heating medium from the heat storage tank 3. The fuel cell system may be used as a monogeneration system that does not supply hot water to an external unit.

Figure 2:
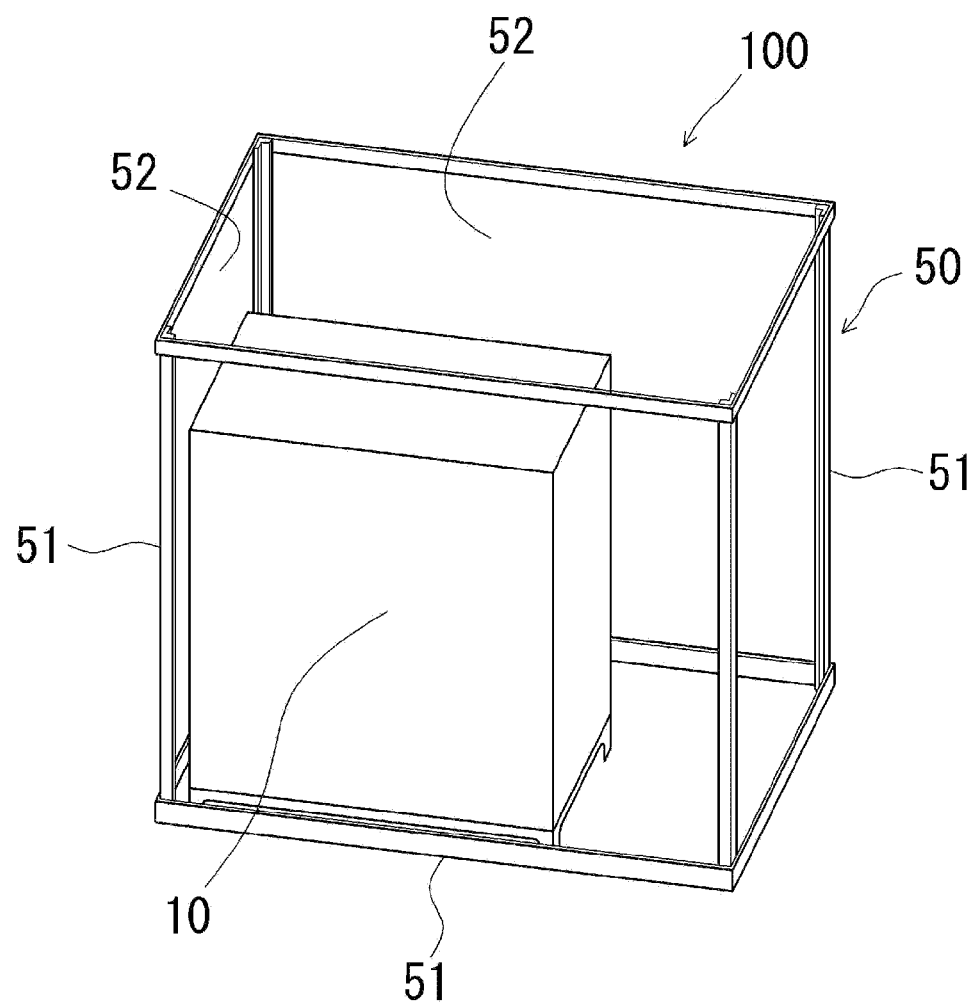
FIG. 2 is a perspective view of the fuel cell system housed in an external case.

The fuel cell system 100 is housed in a case 50 as shown in FIG. 2. The case 50 includes frames 51 and exterior panels 52. The case 50 further contains multiple measurement devices, sensors, and other devices on and around the fuel cell module 10 and the auxiliary devices, the channels, and the piping.

For example, an air flowmeter FM1 is installed on the air channel F in the oxygen-containing gas supply 13, which supplies air to the fuel cell module 10. The air flowmeter FM1 measures the hourly flow rate (in NL/min, where NL is a normal liter) of air (oxygen-containing gas) that is supplied to a cell stack 11.

Although not shown, a similar gas flowmeter is also installed on the raw fuel channel G in the raw fuel supply 14.

The fuel cell system 100 may also include multiple temperature meters or thermometers (not shown), such as temperature sensors and thermistors for measuring the temperature of the components of the fuel cell.

The controller 30 that centrally controls the operation of the fuel cell system 100 is connected to a memory and a display (both not shown) and to various components and various sensors included in the fuel cell system 100. The controller 30 controls and manages these functional components and thus controls and manages the entire fuel cell system 100. The controller 30 also obtains a program stored in its memory, and executes the program to implement various functions of the components of the fuel cell system 100.

To transmit control signals or various types of information from the controller 30 to other functional components or devices, the controller 30 may be connected to the other functional components either with wires or wirelessly. The particular control performed by the controller 30 in the present non-limiting embodiment will be described later.

In the present non-limiting embodiment, the controller 30 specifically controls the operation of the air blower B1 in the oxygen-containing gas supply 13 and the raw fuel pump B2 in the raw fuel supply 14 that supplies a raw fuel gas to a reformer 12 based on the level of output power requested from an external load, instructions and commands from an external unit connected to the fuel cell system (e.g., a water heater), measurement values of, for example, an ammeter indicating the amount of power supply to an external unit and a voltmeter (e.g., apparent power in volt-amperes), or measurement values of various sensors listed above.

More specifically, the controller 30 in the fuel cell system 100 with the structure described above controls the operations of the raw fuel supply 14 and the oxygen-containing gas supply 13 to supply, to each unit cell, a fuel gas and an oxygen-containing gas in amounts intended for operation. This causes each unit cell to generate power and a flow of DC through the unit cell. The power generated by the unit cells is converted to AC power by the power level regulator (power conditioner 20) and is fed to an external load.

The air flow rate control for controlling, or specifically increasing or decreasing the air utilization (Ua) representing the air flow rate to meet the output power level (A) will now be described.

The controller 30 included in the fuel cell system 100 according to the present non-limiting embodiment controls the air blower B1 in response to the level of power generation (in amperes) controllable by the power level regulator (hereinafter referred to as the power conditioner 20). More specifically, the controller 30 controls the oxygen-containing gas utilization (Ua), which is the ratio of the amount of air used by the fuel cell for power generation to the amount of oxygen-containing gas (hereafter, air) supplied to the fuel cell. In detail, the controller 30 controls or regulates the air blower B1 to provide an increase-control section in which the oxygen-containing gas utilization (Ua) increases in accordance with an increase in the output power level of the fuel cell and a decrease-control section in which the oxygen-containing gas utilization (Ua) decreases in accordance with an increase in the output power level.

Figure 3:
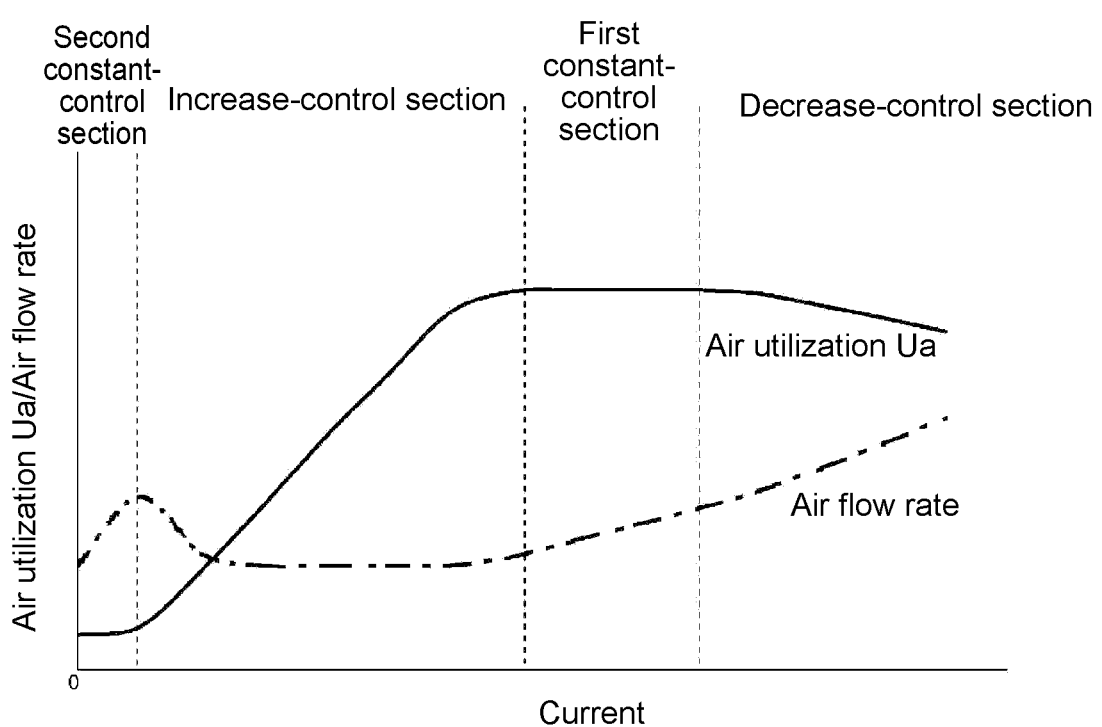
FIG. 3 is a graph showing the relationship between the amount of current resulting from power generation performed by the fuel cell system according to the non-limiting embodiment and the air utilization of each unit cell, and the relationship between the amount of current and the amount of air supplied.

As an example of this control pattern, the graph in FIG. 3 shows the values of air (oxygen-containing gas) utilization (Ua) and the values of the air flow rate against the current (A) as the output power level.

The air utilization and the output power level may be set as appropriate for, for example, the scale of the fuel cell system (rated output power level). Thus, the graph in FIG. 3 merely shows a relational expression of the air utilization (Ua) and the output power level. In the graph shown in FIG. 3, the solid line indicates the air utilization Ua, the dot-and-dash line indicates the air flow rate, and the dotted lines indicate the boundaries of the different control sections (described later).

The control over the air utilization Ua including the increase-control section and the decrease-control section described above will now be described with reference to the graph in FIG. 3. In the graph, a section in which the current value (in amperes) is between 0 and a predetermined power generation level is a constant-control section in which the air utilization Ua is maintained constant (hereafter referred to as a second constant-control section in an aspect of the present disclosure).

The second constant-control section allows for efficient operation although the output power level based on the power level requested by an external load, or specifically the current value (A), is low. The air flow rate is set in the second constant-control section either based on the power generation efficiency or based on the lowest (minimum) flow rate determined by the specifications of the air blower B1 being used. The second constant-control section is defined in correspondence with smaller current values (output power levels) than for an increase-control section (described later).

In the graph shown in FIG. 3, a section in which the current value (A) is between the second constant-control section and a first constant-control section (described later) is defined as the increase-control section according to an aspect of the present disclosure. In the increase-control section, the air utilization Ua increases in accordance with an increase in the current value (the output power level as well as the power level requested by an external load).

As shown in the graph, the air flow rate is constant in the increase-control section. This suggests that an increase in the air utilization Ua in the increase-control section results from an increase in the supply amount of the corresponding fuel gas (hydrogen-containing gas), an increase in the temperature of each unit cell, and an increase in the power generation efficiency (the rate of reaction or the contribution to power generation).

Similarly to the second constant-control section described above, the air flow rate in this section may also be constant and determined by the specifications of the air blower B1 being used.

In the graph in FIG. 3, a section in which the current value (A) is between the increase-control section and the decrease-control section (described below) is defined as a constant-control section in which the air utilization Ua is maintained constant (hereafter referred to as a first constant-control section in an aspect of the present disclosure).

This first constant-control section is defined to maximize the power generation efficiency but to reduce the likelihood of the air utilization Ua increasing excessively and causing insufficient air, possibly causing flame off. In this section, the air utilization Ua is maintained constant. More specifically, the current value and the air flow rate are proportional to each other in the first constant-control section. The first constant-control section is defined to be a section (or range) with the current value (A) or output power level between the increase-control section described above and the decrease-control section described later.

Finally, a section with the highest load current in which the current value (A) is higher than in the first constant-control section in the graph shown in FIG. 3 is the decrease-control section in an aspect of the present disclosure. In the decrease-control section, the air utilization Ua decreases in accordance with an increase in the current value. This section reduces the likelihood of the fuel cell reaching high temperatures.

As shown in the graph, the degree of increase (gradient) in the air flow rate in the decrease-control section is larger than the degree of increase (gradient) in the air flow rate in the first constant-control section described above. In this section following the first constant-control section in which the air utilization Ua is constant, a larger amount of air is supplied to each unit cell by an amount greater than the corresponding increase in the current value (A). This causes the air utilization Ua to be lower in the decrease-control section than in the preceding section, despite the larger output power level (current value) in the decrease-control section than in the preceding section.

For the fuel cell system with the structure that forms the basis of the fuel cell system according to one or more non-limiting embodiments of the present disclosure to maintain high current operation (high output operation) in response to a high level of power requested by an external load, as described above, the fuel cell system maintains the air utilization (Ua) at the predetermined high utilization (high Ua ratio) by increasing the amount of air supplied to each unit cell by the same amount as the corresponding increase in the output current amount to maintain high power generation efficiency.

In contrast, the fuel cell system 100 according to the present non-limiting embodiment uses the section in which the air utilization (Ua) starts decreasing during high current operation to supply more air to the unit cells with high operation efficiency. This reduces the likelihood of the fuel cell reaching high temperatures while maintaining power generation efficiency.

The present disclosure may be implemented in the following forms.

A fuel cell system according to one or more aspects of the present disclosure includes a fuel cell that generates electricity using a fuel gas and an oxygen-containing gas, an oxygen-containing gas supply that supplies the oxygen-containing gas to the fuel cell, a power level regulator that regulates a power level of the fuel cell, and a controller that controls the oxygen-containing gas supply and the power level regulator.

The controller controls the oxygen-containing gas supply and the power level regulator to cause the power level of the fuel cell controllable by the power level regulator and an oxygen-containing gas utilization to have an increase-control section in which the oxygen-containing gas utilization increases in accordance with an increase in the power level of the fuel cell and a decrease-control section in which the oxygen-containing gas utilization decreases in accordance with an increase in the power level of the fuel cell. The oxygen-containing gas utilization is a ratio of an amount of the oxygen-containing gas used by the fuel cell for power generation to an amount of the oxygen-containing gas supplied to the fuel cell.

The fuel cell system according to one or more non-limiting embodiments of the present disclosure controls the power level and the air utilization (Ua) in the fuel cell by using a section or a range with the power level defined as the decrease-control section in which the air utilization (Ua) decreases in accordance with an increase in the power level based on the power level requested by an external load. This lowers the temperature of the fuel cell while maintaining power generation efficiency. This improves the durability and the service life of the unit cells while improving power generation efficiency.

The present disclosure may be embodied in various forms without departing from the spirit or the main features of the present disclosure. The non-limiting embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 10 fuel cell module
11 cell stack
12 reformer
20 power conditioner
30 controller
13 oxygen-containing gas supply
100 fuel cell system
B1 air blower
FM1 air flowmeter

The invention claimed is:

1. A fuel cell system, comprising:
a fuel cell configured to generate electricity using a fuel gas and an oxygen-containing gas;
an oxygen-containing gas supply configured to supply the oxygen-containing gas to the fuel cell; and
a power level regulator configured to regulate a power level of the fuel cell;
wherein
a controller of the fuel cell system is configured to control the oxygen-containing gas supply and the power level regulator to operate the fuel cell, in which the power level of the fuel cell is configured to be controlled based on the power level regulator and an oxygen-containing gas utilization in accordance with:
an increase-control section in which the oxygen-containing gas utilization increases in accordance with an increase in the power level of the fuel cell and
a decrease-control section in which the oxygen-containing gas utilization decreases in accordance with an increase in the power level of the fuel cell, and
the oxygen-containing gas utilization is a ratio of an amount of the oxygen-containing gas used by the fuel cell for power generation to an amount of the oxygen-containing gas supplied to the fuel cell.

2. The fuel cell system according to claim 1,
wherein the controller is configured to control the oxygen-containing gas supply and the power level regulator to have the decrease-control section in response to the power level of the fuel cell being greater than or equal to a first predetermined amount.

3. The fuel cell system according to claim 2,
wherein the controller is configured to control the oxygen-containing gas supply and the power level regulator to have, between the increase-control section and the decrease-control section, a first section in which the oxygen-containing gas utilization is constant against an increase in the power level of the fuel cell.

4. The fuel cell system according to claim 3,
wherein the controller is configured to control the oxygen-containing gas supply and the power level regulator to have a second section in which the oxygen-containing gas utilization is constant against an increase in the power level of the fuel cell in correspondence with the power level smaller than for the increase-control section.

* * * * *